Patented Nov. 11, 1952

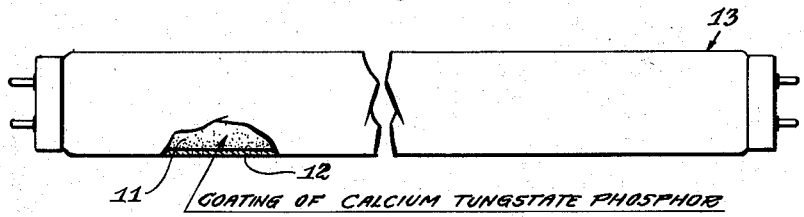

2,617,773

UNITED STATES PATENT OFFICE 2,617,773

LEAD-ACTIVATED CALCIUM TUNGSTATE PHOSPHOR

Rudolph Nagy and Robert William Wollentin, Bloomfield, N. J., assignors to Westinghouse Electric Corporation, East Pittsburgh, Pa., a corporation of Pennsylvania Application September 10, 1948, Serial No. 48,736

9 Claims. (Cl. 252—301.5)

This invention relates to phosphors, methods of making and, more particularly, to an improved calcium tungstate phosphor avoiding the use of harmful material.

The principal object of our invention, generally considered, is to produce an efficient calcium tungstate phosphor, while avoiding the use of material, such as sulfates, which develop undesirable products, such as sulfur trioxide, during firing.

Another object of our invention is to produce a magnesium-oxide-activated calcium tungstate phosphor, in order to obtain a large increase in output.

A further object of our invention is to employ magnesium oxide, or a compound breaking down to the oxide upon heating, for activating the calcium tungstate phosphor, in addition to the use of lead as an activator.

Other objects and advantages of the invention will become apparent as the description proceeds.

Referring to the drawing,

Figure 1 is a fragmentary elevational view, with a part in longitudinal section, of a fluorescent lamp embodying our invention;

Figure 2 is a flow diagram illustrating embodiments of our invention.

Calcium tungstate has previously been prepared for fluorescent purposes by adding sulfuric acid to calcium carbonate and tungstic acid. This procedure has been modified by using calcium sulfate, in place of calcium carbonate and sulfuric acid. In both of these methods, there is evolved during firing a large proportion of sulfur trioxide which is not only obnoxious and detrimental to the workers, but reacts with other phosphors and causes deterioration thereof.

In accordance with our invention we propose to eliminate the use of sulfuric acid and sulfates, at the same time producing a phosphor having a high output. We have accomplished this by using a small amount of magnesium oxide in with the calcium carbonate and tungstic acid, in addition to the lead activator. The magnesium oxide is also considered as an activator, because by employing it in chemical combination, as disclosed, a 30% to 40% increase in the output is obtained, as compared with that using the sulfate method. A preferred formula for the raw materials used in making calcium tungstate, in accordance compared with that of our invention, is about as follows:

1 mole calcium carbonate (phosphor grade)
1 mole tungstic acid (phosphor grade)
$\frac{1}{10}$ mole magnesium oxide
1% of lead, as a compound (such as lead nitrate), decomposable to the oxide upon firing with the liberation of no matter harmful to the phosphor All the ingredients are ground, as by placing in a ball mill with a small amount of distilled water and rolling for about one hour. The ground material, as a slurry, is then desirably dried overnight at about 130° C. and reground dry in an otherwise similar manner for about another hour. The material is then fired, desirably in silica trays placed in an electric furnace, for about one hour at about 800° C. The fired material is ground, as in a ball mill, for about one half hour, and refired at about 900° C. for about one hour. If, in testing, the output is found to be too low, an additional firing is given at about 900° C. to effect a more complete chemical combination. All of the foregoing method is indicated in Figure 2, following the left branch of the flow diagram.

Another method which lends itself better to factory production, although it does not give a better phosphor than that above described, involves use of a similar formula for raw materials, about as follows:

1 mole calcium carbonate (phosphor grade)
1 mole tungstic oxide (phosphor grade)
$\frac{1}{10}$ mole magnesium oxide
1% of lead, as a compound such as in the preceding example, but preferably as lead carbonate The above ingredients are ground dry, as in a ball mill, for about two hours, and then fired at about 800° C. for about one hour, reground for about one half hour, and finally refired at about 900° C. for about one hour. All of the foregoing method is indicated in Figure 2, following the right branch of the diagram. The amount of magnesium can be varied within the limits of .13 mole and .02 mole, and improved results obtained. However, we consider the optimum proportion as about $\frac{1}{10}$ mole. Other compounds of magnesium, such as the hydroxide, carbonate, nitrate. or another decomposing on heating to the oxide with the liberation of gases which do not harmfully affect the phosphor, can be satisfactorily used in place of the oxide. The amount of lead is specified as the optimum, but small variations either way are permissible within the spirit and scope of the invention.

Whether made by one method or another, the completed phosphor, which in this particular instance is a chemical compound or solid solution because the ingredients are mixed and then fired, as distinguished from a mixture of calcium tungstate with magnesium oxide without firing, is then applied in a known manner as a coating 11 to the inner surface of the envelope 12 used for making a fluorescent lamp designated 13 in Figure 1.

Although preferred embodiments of our invention have been disclosed, it will be understood that modifications can be made within the spirit and scope of the appended claims.

We claim:

1. A phosphor for fluorescent lamps consisting of the fired reaction product of the following constituents in about the stated proportions: 1 mole calcium carbonate; 1 mole tungstic acid; $\frac{1}{10}$ mole of a magnesium compound selected from the oxide and those decomposing to the oxide upon heating with the liberation of no matter harmful to the phosphor, and 1% of lead, as a compound decomposing to the oxide upon heating with the liberation of no matter harmful to the phosphor.

2. A phosphor for fluorescent lamps consisting of the fired reaction product of the following constituents in about the stated proportions: 1 mole calcium carbonate; 1 mole tungstic acid; $\frac{1}{10}$ mole magnesium oxide; and 1% of lead as the nitrate.

3. A phosphor for fluorescent lamps consisting of the fired reaction product of the following constituents in about the stated proportions: 1 mole calcium carbonate; 1 mole tungstic oxide; $\frac{1}{10}$ mole magnesium oxide; and 1% of lead as the carbonate.

4. The method of making a phosphor of high output, comprising grinding together ingredients in about the following proportions with a small amount of distilled water for about one hour; 1 mole of calcium carbonate, 1 mole of tungstic acid, $\frac{1}{10}$ mole of magnesium oxide, and 1% lead as the nitrate, drying at about 130° C., regrinding for about one hour, firing the mixture for about one hour at about 800° C., drying for about one half hour, and refiring at about 900° C. for about one hour.

5. The method of making a phosphor of high output, comprising grinding together ingredients in about the following proportions for about two hours in the dry state; 1 mole of calcium carbonate, 1 mole of tungstic oxide, $\frac{1}{10}$ mole of magnesium oxide, and 1% of lead as the carbonate; firing the mixture at about 800° C. for about one hour, grinding for about one half hour, and refiring at about 900° C. for about one hour.

6. A phosphor for fluorescent lamps consisting of the fired reaction product of the following constituents in about the stated proportions: material to make one mole of calcium tungstate; about 1% of lead as a compound for activation; and between .13 and .02 mole of magnesium as a compound selected from the oxide and those which break down to the oxide upon heating with the liberation of no matter harmful to the phosphor to effect additional activation.

7. A high-efficiency phosphor for fluorescent lamps consisting of the fired reaction product of the following constituents in about the stated proportions: material to make one mole of calcium tungstate; about 1% of lead as a compound for activating the same; and between .13 and .02 mole of magnesium oxide per mole of calcium tungstate as additional activating material.

8. The method of making a phosphor comprising mixing ingredients in about the stated proportions: material to make one mole of calcium tungstate; between .13 and .02 mole of a magnesium compound selected from the oxide and compounds which break down to the oxide upon heating with a liberation of gases harmless to the phosphor; and about 1% of lead as a compound for activation; and firing to effect combination of the ingredients.

9. The method of making a phosphor comprising mixing the following constituents in about the stated proportions: material to make one mole of calcium tungstate; about 1% of lead as a compound selected from those decomposable to the oxide with the liberation of no matter harmful to the phosphor; and between .13 and .02 mole of magnesium as a compound selected from the oxide and those which break down to the oxide upon heating with the liberation of no matter harmful to the phosphor; and firing to effect combination of said ingredients to produce the desired phosphor.

RUDOLPH NAGY.
ROBERT WILLIAM WOLLENTIN.

REFERENCES CITED

The following references are of record in the file of this patent:

UNITED STATES PATENTS

| Number | Name | Date |
|---|---|---|
| 2,132,273 | Roberts | Oct. 4, 1938 |
| 2,235,802 | Lemaigre-Voreaux | Mar. 18, 1941 |
| 2,324,843 | Hultgren | July 20, 1943 |

FOREIGN PATENTS

| Number | Country | Date |
|---|---|---|
| 494,299 | Great Britain | Oct. 20, 1938 |
| 528,552 | Great Britain | Oct. 31, 1940 |
| 567,494 | Great Britain | Feb. 16, 1945 |